E. C. BURNS.
GEARING FOR MOTOR VEHICLES.
APPLICATION FILED MAY 12, 1913.

1,257,311.

Patented Feb. 26, 1918.
3 SHEETS—SHEET 1.

Witnesses
R. R. Bond.
E. D. V. F. Brown.

Inventor
Edward C. Burns
By E. H. Bond
Attorney.

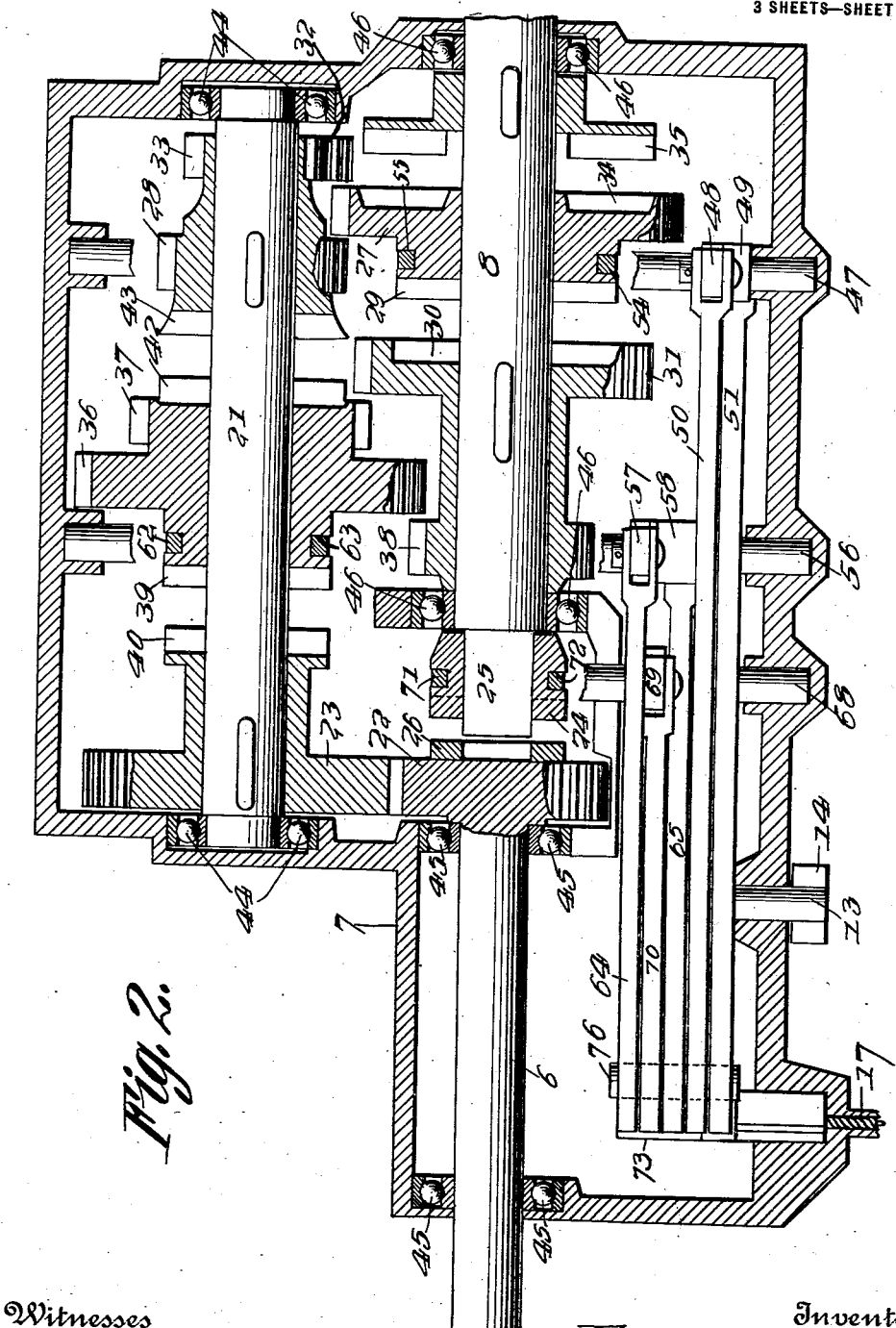

E. C. BURNS.
GEARING FOR MOTOR VEHICLES.
APPLICATION FILED MAY 12, 1913.
1,257,311.
Patented Feb. 26, 1918.
3 SHEETS—SHEET 3.
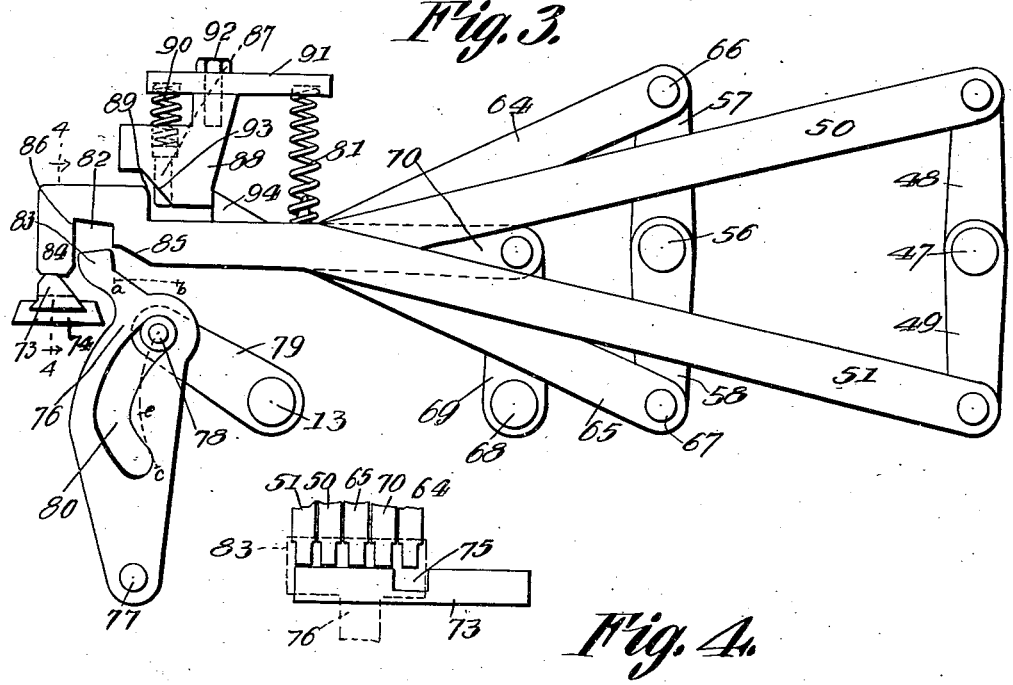
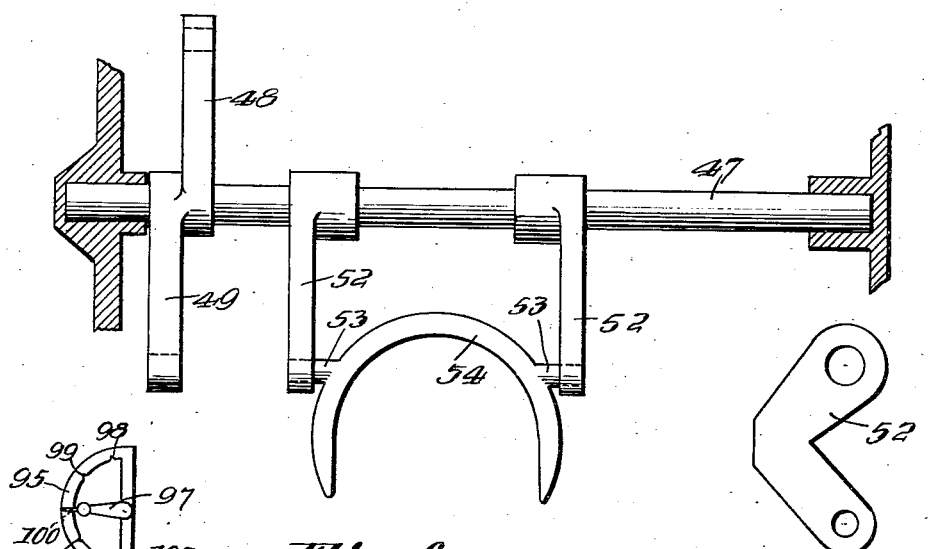
Witnesses
R. R. Bond
C. D. B. Brown
Inventor
Edward C. Burns,
By E. A. Bond
Attorney

UNITED STATES PATENT OFFICE.

EDWARD C. BURNS, OF KANSAS CITY, MISSOURI.

GEARING FOR MOTOR-VEHICLES.

1,257,311.

Specification of Letters Patent.   Patented Feb. 26, 1918.

Application filed May 12, 1913.   Serial No. 767,090.

*To all whom it may concern:*

Be it known that I, EDWARD C. BURNS, a citizen of the United States of America, and resident of Kansas City, county of Jackson, and State of Missouri, have invented certain new and useful Improvements in Gearing for Motor-Vehicles, of which the following is a specification.

This invention relates to certain new and useful improvements in gearing for motor vehicles and pertains more particularly to the shifting mechanism therefor.

The present invention has for its objects among others to provide a novel construction and arrangement of shifting gears and means whereby the act of shifting is made quicker and easier for the operator and in which the gears are caused to mesh with minimum liability of injury to the teeth.

I provide a hand controlling device capable of being set previous to and independent of any of the actual acts of meshing or rejecting any speed. Then the desired gear is obtained by the same movement of the driver's foot with which the friction clutch is controlled, leaving the hands and attention of the driver free for other duties at the actual instant of changing.

The gear shifting mechanism is capable of adaptation to practically any form of gear transmission. The transmission mechanism may be used with any gear shifting system now in use.

I aim further at improvements in the details of construction whereby better results are produced at minimum cost combined with ease of application and assured efficiency and durability in use.

The invention is capable of embodiment in a variety of forms, the accompanying drawings being shown merely for the purpose of illustrating what at the present time appears to me to be among the most preferable ones, but it is to be understood that the invention is in no wise restricted to the particular details of construction, arrangement of parts, relative proportions and other constructive features, but I reserve the right to cover such variations and modifications as come properly within the scope of the protection prayed.

The invention in such forms is clearly illustrated in the accompanying drawings, which, with the numerals of reference marked thereon, form a part of this specification, and in which Figure 1 is a sectional view showing in dotted lines the parts constituting my present improvement, with such other parts of a motor vehicle as are necessary for a proper understanding of the application of my invention thereto.

Fig. 2 is a substantially central longitudinal section through the transmission mechanism with portions broken away, showing my invention applied thereto.

Fig. 3 is a side elevation, on an enlarged scale, of the shifting mechanism separated from the other parts.

Fig. 4 is a vertical section as on the line 4—4 of Fig. 3.

Fig. 5 is an elevation of one of the actuating arms removed from its shaft.

Fig. 6 is an elevation with parts in section of the rock shaft and its accessories.

Fig. 9 is a detail of the indicator.

Like numerals of reference indicate like parts throughout the different views.

Figures 1, 7, 8:
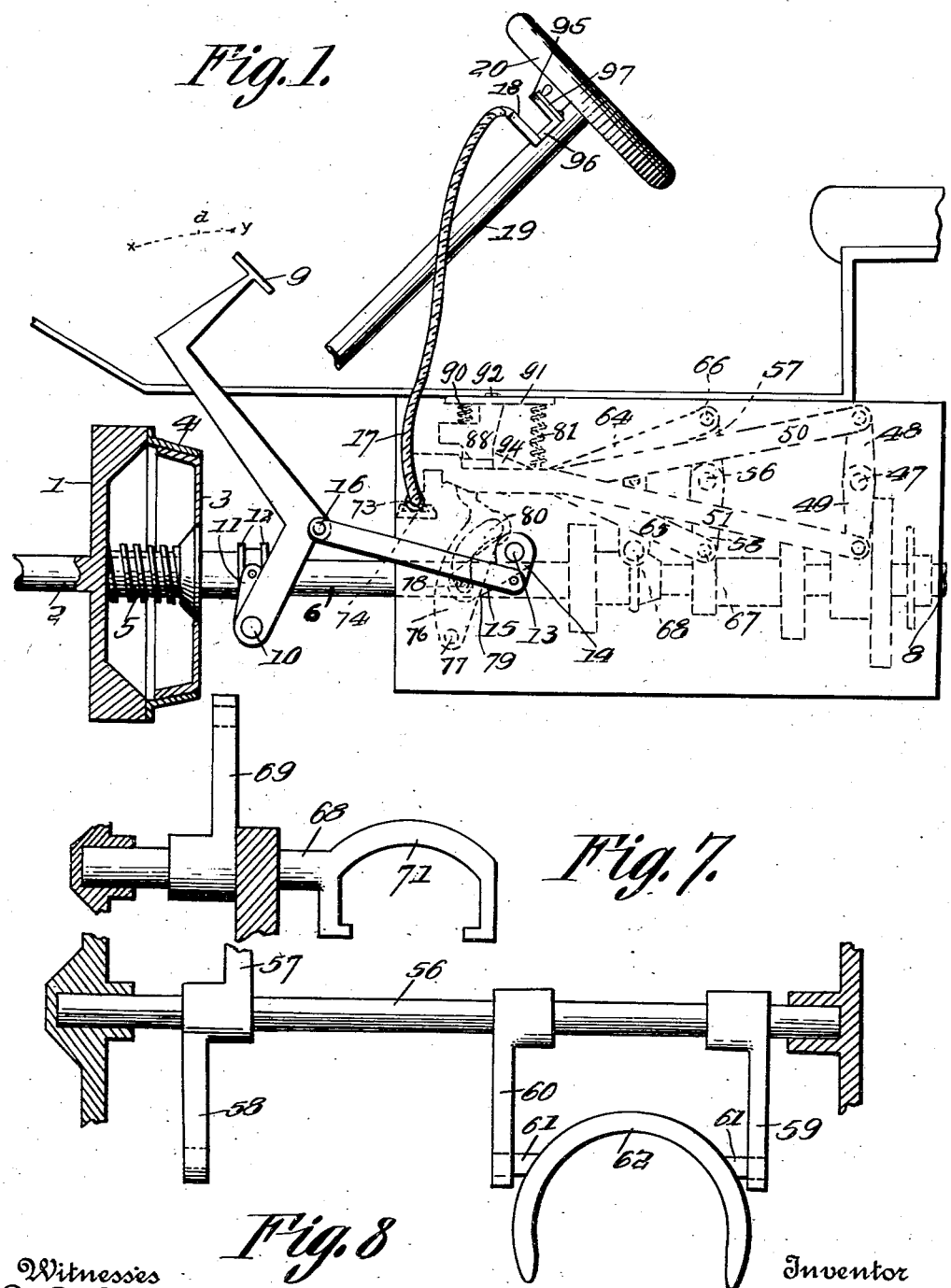
Fig. 7 is an elevation with parts in section of another shaft which moves the direct drive clutch.
Fig. 8 is a view similar to Fig. 6 showing another one of the rock shafts and its accessories.

Referring to the drawings, first to Fig. 1, 1 designates the driving part of a friction clutch carried by the shaft 2 connected in any well-known way to a motor, not shown. 3 is the coöperating and driven part of the clutch held against the coacting member 4 of the clutch 1 by a spring 5. 6 is the clutch shaft which introduces the power into the gear box or casing 7, from which the shaft 8 delivers the power to the wheels by suitable connections.

9 is the foot pedal connected with the shaft 10 carrying the arms 11 keyed to said shaft and operatitng between the collars 12, as seen clearly in Fig. 1, so that when the foot pedal is depressed the shaft 10 will be rotated counter-clockwise, and through the medium of the arms 11 acts to throw out the collars 12 and thus release the clutch.

13 is a shaft to which is connected the arm 14 which, in turn, is connected by a link or connecting rod 15 with the foot pedal, as at 16, the connection in this instance being shown as at the angle of the foot pedal lever. The pedal member during its entire arc of movement from *x* to *y* imparts a proportional multiplied arc of movement to the arm 14 through the connecting rod 15, rocking the shaft 13 through an arc of 60° of movement.

17 is a flexible cable, such, for instance, as a Bowden wire, well-known in this art, and connects a hand-controlled indicator 18 with controlling devices inside the gear box 7. This indicator 18 may be mounted in any position convenient to the driver's seat, in this instance shown as being upon the steering column 19 of the steering wheel 20. This construction and arrangement of parts as shown in Fig. 1 is only approximate, but serves to show the ease of insulation of this system in an ordinary car frame. The cable 17 may be disposed in any other convenient way, while various means may be employed to insure that the shaft 13 rocks through its arc while the pedal rocks through its entire arc x—y.

Referring now to Fig. 2, the shafts 6 and 8 are shown on the same axis and in the same horizontal plane with a shaft 21 which is a countershaft driven constantly from the shaft 6 by means of the intermeshing gears 22 and 23 on the shafts 6 and 21 respectively. Each of these shafts 6, 8 and 21 has bearings independently of one another. 24 is a dog clutch slidably mounted upon a squared portion 25 of the shaft 8 so as to always rotate with said shaft. 26 are jaws or coöperating clutch members fast upon the gear 22 so that when the members 24 and 26 are interlocked, the shafts 6 and 8 revolve together.

27 is a gear upon the shaft 8 so that when in the position shown it may both slide freely axially of said shaft and turn independently thereon. If it is caused to slide to the left, it first meshes with a pinion 28 keyed tightly upon the shaft 21. A continued movement of the gear 27 in the same direction interlocks the jaws 29 thereof with the jaws 30 on a gear 31 fast upon the shaft 8. Thus when fully in mesh, the gear 27 must turn with the shaft 8 driving it in the same direction as the shaft 6, but at about one-third speed. If the gear 27 is caused to slide to the right, it meshes with an idler 32 constantly in mesh with a pinion 33 fast on the shaft 21 and this gear 27 is provided with jaws 34 adapted to lock with jaws 35 fast upon the shaft 8, thus driving the shaft 8 slowly in a direction reverse to the shaft 6.

36 and 37 are gears which are mounted to slide as one piece upon the shaft 21 in a similar manner to the sliding of the gear 27 on the shaft 8. When they slide to the left, gear 36 meshes with a gear 38 on the shaft 8 and the clutch 39 with the clutch 40, then the shaft 8 revolves in the same direction as the shaft 6 but somewhat faster. If caused to slide to the right, the gear 37 will mesh with the gear 31 and the jaws 42 on the gears 36, 37 are in mesh with the jaws 43 on the gear 28, thus driving the shaft 8 in the same direction as the shaft 6 but at about one-half the rate of speed thereof.

Ball bearings are provided for the ends of the shafts, as indicated at 44 and 45 and 46 respectively, see Fig. 2.

Referring now to the shifting mechanism; it embodies a shaft 47 which is mounted in suitable bearings and lies in a plane horizontal to and above the plane of the shafts 8 and 21, but at right angles to the length thereof, see Figs. 1 and 2. Arms 48 and 49 are fast upon this shaft, but extend in substantially diametrically opposite directions from its center, the one extending upwardly and the other downwardly, as seen in said Figs. 1 and 6, and also in Fig. 3. Links 50 and 51 are joined respectively to the outer ends of the arms 48 and 49 and extend to a point in advance of the shaft 47 so that their heads may be brought together side by side horizontally, as seen best in Fig. 3. This construction is such that if a movement toward the right be given to the forward end, that is the left hand end of the link 50, the shaft 47 will be rocked in a clockwise manner, but if the same movement be given to the link 51, then the shaft 47 will be rotated in a counter-clockwise or reverse direction. Fast upon this shaft 47 are arms 52 in the free ends of which are mounted the journals 53, as seen in Fig. 6, which carry the yoke or horse-shoe collar 54 which is designed to engage in the annular groove 55 in the gear 27, as seen clearly in Fig. 2, so that the rotation of the shaft 47 slides the gear 27 in accordance with the selected link to which to apply the actuating force, as will be made clear hereinafter.

56 is a transverse shaft mounted in suitable bearings within the casing or box 7 and fast thereon are the arms 57 and 58 extending in opposite directions therefrom, one upward and the other downward, as seen best in Fig. 8. On this shaft are the arms 59 and 60 in which are mounted the journals 61 of the yoke or horse-shoe collar 62 which is designed to engage in annular groove 63 in the clutch member 39 of the gear 36, as seen in Fig. 2, so as to control the movement of the second and fourth gears 37 and 36 respectively in a manner which will be more fully described hereinafter.

64 and 65 are links or rods connected with the free ends of the arms 57 and 58, as seen at 66 and 67 respectively. The other ends of these links are brought forward to the same location as the forward ends of the links or rods 50 and 51, as seen in Figs. 2 and 3.

68 is a shaft journaled in a bearing in the gear box or casing, as shown in Figs. 1 and 2, and having connected therewith a vertical arm 69 to which is connected the link or connecting rod 70, the forward end of which is brought to a point adjacent the forward ends of the links 50, 51, 64 and 65, as seen best in Fig. 2. This shaft carries the yoke or clutch actuating member 71 which is designed to work in an annular groove 72 in the dog clutch member 24, as seen in Fig. 2.

At the free ends the links 50, 51, 65, 64 and 70 are shown as supported upon a finder member or controller 73 mounted to slide endwise on a suitable support or in suitable guides 74 at right angles to the length of said links. Fig. 4 shows the links in their order as they rest upon the support 73. In the upper face of the slide 73 is a slot or notch 75 which is shown as directly below the link 64 and into which the latter is about to fall. This slot registers with the corresponding link according to the movement of the indicator soon to be described. The dimensions of parts are such that between each figure on the indicator a neutral point is secured where no link can enter said slot; also a certain amount of play may occur in the connection between the indicator and the notch in the slide so as not to interfere with the proper action.

76 is an actuating lever for the gear shift. It is mounted upon a pivot 77 supported in the wall of the gear box and swings over an arc $a$—$b$, as indicated in Fig. 3, in a vertical plane parallel to the length of the links. A roller 78 carried by an arm 79 fast upon the shaft 13 moves in a cam slot 80 in the lever 76, as seen clearly in Fig. 3, so as to impart motion to the lever 76 so that when the pedal is in the position in which it is indicated in Fig. 1, the roller will be at the point $c$ in Fig. 3, that is at the lower end of the cam slot and the lever will have moved to the end $b$ of the arc. When the pedal is at the point $d$, Fig. 1, and the clutch released, the roller 78 will be at the point $e$ in the cam slot and the lever 76 will still be at the point $b$ of the arc, but when the pedal is moved to the point $x$ in Fig. 1, the roller 78 will be at the upper end of the cam slot, as shown in Fig. 3, and the lever 76 will be at the position in which it is shown in said figure. When the lever 76 is in the position shown in Fig. 3, the link representing the desired gear may be forced into the slot 75 of the slide 73 by means of a spring 81 bearing upon said link. In this position, a notch 82 on the under side of the link at its free or head end engages with a suitably shaped head 83 projecting upward from the lever 76 so that the link must then move with the said lever and impart the desired rotation to the gear moving shaft. It is to be understood that each link has at its free or head end a similar notch and that the depending point 84 of each link bears upon the slide 73, as will be best understood upon reference to Fig. 3.

When the lever 76 moves to the right from the position in which it is shown in Fig. 3, it strikes an inclined surface 85 on the under side of the links not engaged and lifts them off from the slide 73. This slide may then be moved to the position of the next desired link without any effect upon the shifter mechanism. The rear surface of the slide 73 is wedge-shaped, as indicated in Fig. 3, so that if the slot 75 has been moved from in front of the last engaged link as the lever 76 approaches the position in which it is shown in Fig. 3, the link strikes this slope or incline of the slide 73 and rises up off from the portion 83 of the lever. The construction and arrangement of parts is such that the link reaches the top face of the slide 73 perceptibly before the lever 76 reaches its farthest position to the left, but it must continue to bring the gear to neutral position because the face 86 is somewhat longer than the rise and fall of the link. Consequently, the slide 73 forces the disengagement of a link by positive metal surfaces and permits the engagement through the agency of springs which may be assisted by gravity, so if a spring should break in use, a slight pause at the position $x$ in Fig. 1 of the pedal would allow the parts to perform their function as usual.

87 are latching pins, one for each link, mounted to slide in suitable guides in a block or member 88 and adapted to act upon the slightly angular corners 89 of the links, as seen clearly in Fig. 3. These pins are pressed toward the links by springs 90, as seen in Fig. 3, which springs are supported in a cross member 91 secured to the block 88 in any suitable manner, as by screws 92, all as shown in Fig. 3. The spring 81 is also supported in this cross member 91, as will be clearly evident from said Fig. 3. The office of these latching pins is to hold the links not representing a desired gear from moving when the lever 76 first moves away from its farthermost position at the left. When the link falls into the slot 75 of the slide 73, it frees itself from the latching pin 87 by the same motion with which it grips the lever 76, without friction. The inclined face 93 of the block 88 conforms to the travel of the corner 89 of any link as said link rises upon the slide 73 during the rejection of its corresponding gear. When the lever 76 raises the links by striking face 85 it brings the inclined surfaces 89 and 93 into close relation so that the necessary clearance between them to secure easy operation of the parts is much smaller than the usual clearance allowed at the neutral position, between the teeth of two clashing gears so that when one gear is in use, the others are positively locked in neutral by means other than the latch pins 87.

When two links are connected to one shaft in the afore-mentioned manner, then if one moves the other must move, but in an opposite direction. Consequently, when the faces 86 and 83 meet, then all further movement must cease. The link 70 has no opposing link, so a lug 94 projecting from the top face of said link 70 adjacent the block 88 acts against the rear surface of said block 88, thus preventing any forward movement of said link 70 beyond the position shown in Fig. 3. Faces 86 on the heads of the links can never get to the rear or right of the projection 83 on the lever 76. Consequently, every time the lever 76 is in the position in which it is seen in Fig. 3, all gears are positively located in neutral; all links are positively lined up ready to drop on the projection 83 of the lever. All links not wanted are positively rejected by the slide 73.

An indicator 95 is placed upon an extension 96 of the steering stem 19, or in any other suitable position and a finger or pointer 97 is provided for use in conjunction therewith. This indicator is provided with notches 98, 99, 100, 101 and 102, as seen clearly in Fig. 9, corresponding to the various links 64, 70, 65, 50 and 51, so that by movement of the finger or pointer along the arc and stopping it at any one of these points of designation, the operator knows which link is thrown into operative position.

The finder or slide 73 is designed to be actuated through the movement of the Bowden wire 17, which is constructed so as to push or pull, as is well known in this art.

From the foregoing description, the mode of operation will be apparent and a further detailed description thereof does not seem necessary, but to further exemplify the use of the mechanism hereinbefore described, the following example of their action in the actual drive of a motor car will suffice. While the car is standing still with the engine running and the driver absent from his seat, the foot pedal 9 will be in the position in which it is shown in Fig. 1, the clutch 3—4 is engaged, the lever 76 is in the position at the end $b$ of the arc indicated in Fig. 3, but no link is upon it, so no gear or clutch inside of the gear box is engaged. Now when the driver takes his seat and places the indicator at 101 and places his foot on the pedal and pushes the same to the position $x$ in Fig. 1, the clutch 3—4 is released and through the medium of the rod 15, the arm 14, the shaft 13, the arm 79 and the roller 78 working in the cam slot 80, the lever 76 is moved to its farthermost position to the left, that seen in Fig. 3. As the portion 83 of the lever leaves the inclined surface 85 of the links, all the links will fall upon the slide 73 and the link 50 will enter the slot 75 of the slide where it must coact with the portion 83 of the lever 76. The driver now reduces the foot pressure on the foot pedal 9 which returns toward him, impelled by energy stored in the spring 5 of the clutch. The lever 76 now moves toward the right in Fig. 3 to the point $b$ of its arc exerting a backward push on the link 50, rocking the shaft 47 clockwise. The arms 52 by means of the yoke 54 in the annular groove 55 of the gear 27 slide the latter forward. This gear then clashes against the gear 28 which is rotating from momentum acquired before the clutch was released. The teeth of the gear 27 quickly attain the same speed as those of the gear 28 because the gear 38 floats loosely upon its shaft 8 and the forces to be overcome are limited mainly to the inertia of the gear 27. The gear 27 now meshes with the gear 28 and slides forward and the jaws 29 interlock with the jaws 30 of the gear 41 and the gear 27 is now fastened circumferentially to the shaft 8 and the shafts 21 and 6 are stopped from rotating. By the use of well-known spiral ends or equivalent on the clutch jaws, they enter one another quickly and surely. When the foot pedal 10 has reached the position $d$ in its arc, see Fig. 1, the gear 27 is fully meshed, but the clutch member 3 has not yet engaged the clutch member 4 so the car has not moved. The indicator is now set at 100 and the driver permits the pedal to return slowly from the point $d$ to the point $y$ in its arc and the car starts. As soon as sufficient momentum is acquired on this speed, the operator quickly pushes the pedal as far forward as it will go and quickly returns it to the position $y$ with the same final "easing in" given a friction clutch. The car will now be driven in the second speed with the gears 31 and 37 in mesh and the clutches 42 and 43 interlocked. This exemplifies the advantages secured by my present improvement. The changing of gears may be done almost instantly while the hands and attention of the driver are left free for other duties and by the same means by which the clutch is controlled, an act always required any way during shifting. This combination of clashing gears with dog clutches reduces the impact of entering teeth to the minimum and places the greater duty of changing the relative speed of the shafts and clutch parts upon clutches which are much stronger and can be adapted to instantly enter one another better than gear teeth.

Among some of the advantages not heretofore specifically named may be mentioned the following; the indicator and finder action may be set for the next desired speed before the one in use is rejected or thrown out of operation.

Each speed has its own engaging pawl or link which is controlled by the finder to obtain the necessary engagement or disengagement between the actuating lever and the sliding gear.

Said links are preferably in constant connection with the shiftable elements and selectively engaged with the actuating lever.

The gear finder—the controller, permits the links to engage with the corresponding actuating piece through the agency of the springs but compels disengagement by positive metal to metal surfaces.

Only at "pick up" position are the links allowed in contact with the finder, consequently at "gear-engaged" position the finder has no effect upon any part or action of the car, or vice versa.

The movement of the links out of contact with the finder allows them to act in connection with stationary parts so they become positive locks to hold at neutral point any gears not in use.

The links not representing a desired gear are held, at "pick up" position, by spring latches from whose grip the desired link frees itself by the same motion with which it connects with the actuating lever.

The finder exercises no control over the moving of the gear to neutral point by the actuating lever. The two disconnecting actions connected with any gear which slides both ways from neutral position lock upon the actuating lever at the neutral point "pick up" position and prevent further movement.

Every time the actuating lever is ready to accept a link, all gears are positively located at neutral with the latches set and all links are positively lined up for use and all links not representing a desired gear are positively held against use by the "finder."

The links may be in constant connection with the actuating mechanism and selectively connected to the shiftable elements, if preferred.

Other modification in details of construction etc., may be resorted to without departing from the spirit of the invention or sacrificing any of its advantages.

No claim is made herein to the variable speed transmission gearing herein shown and described *per se*, as the same will form the basis of a separate application.

What is claimed as new is:—

1. In a device of the class described, the combination with a variable speed transmission gearing having a plurality of shiftable elements, of a controller, pivoted members interposed between the same and said elements, adapted to be placed in operative relation to said controller, and selective mechanism operatively connected with said controller.

2. In a device of the class described, a variable speed transmission gearing having a plurality of shiftable elements, a movable finder, pivoted members supported by and coöperating therewith and operatively connected with said elements, means for controlling the finder, and means for moving said pivoted members.

3. In a device of the class described, a variable speed transmission gearing having a plurality of shiftable elements, in combination with a movably mounted finder, a plurality of pivoted members supported by and adapted for coöperation therewith and operatively connected with said elements, and locking means for said members.

4. In a device of the class described, a variable speed transmission gearing having a plurality of shiftable elements, in combination with a movably mounted finder, a plurality of pivoted members supported by and adapted for coöperation therewith and operatively connected with said elements, locking means for said members, and an actuating lever for coöperation with said members.

5. In a device of the class described, a variable speed transmission gearing having a plurality of shiftable elements, means for shifting said elements embodying pivoted members movable with said elements, a selective finder coöperating with said pivoted members, an indicator for coöperation with said finder, said finder having a notch into which the selected member falls by gravity, and a locking means for the selected member.

6. In a device of the class described, a variable speed transmission gearing having a multiplicity of shiftable elements, in combination with pivoted members movable therewith, a finder movable at right angles to said members and having a notch for coöperation with the selected member, and an actuating lever coöperating with said members.

7. In a device of the class described, a variable speed transmission gearing having a multiplicity of shiftable elements, in combination with pivoted members movable therewith, a finder movable at right angles to said members and having a notch for coöperation with the selected member, and an actuating lever coöperating with said members and having a cam slot and means which shifts said shiftable elements of the speed transmission mechanism.

8. In a device of the class described, a variable speed transmission gearing having a plurality of shiftable elements combined with a foot pedal, and connections, embodying an actuating lever, a plurality of pivoted members coöperating with said lever, a movably mounted finder for supporting and coöperation with said members, and means for moving the finder at right angles to said members.

9. In a device of the class described, a variable speed transmission gearing having a plurality of shiftable elements combined with a foot pedal and connections, embodying an actuating lever, a plurality of pivoted members coöperating with said lever, a movably mounted finder for coöperation with said members, and means for moving the finder at right angles to said members, said finder having a notch into which a selected member falls by gravity.

10. In a device of the class described, a variable speed transmission gearing having a plurality of shiftable elements combined with a foot pedal and connections, embodying an actuating lever, a plurality of pivoted members coöperating with said lever, a movably mounted finder for coöperation with said members, means for moving the finder at right angles to said members, said finder having a notch into which a selected member falls by gravity, and means for locking said members.

11. In a device of the class described, a variable speed transmission gearing having a plurality of shiftable elements combined with a foot pedal and connections, embodying an actuating lever, a plurality of pivoted members coöperating with said lever, a movably mounted finder for coöperation with said members, means for moving the finder at right angles to said members, said finder having a notch into which a selected member falls by gravity, and yielding means acting on said members tending to depress them.

12. In a device of the class described, a variable speed transmission gearing having a plurality of shiftable elements combined with a foot pedal and connections, embodying an actuating lever, a plurality of pivoted members coöperating with said lever, a movably mounted finder for coöperation with said members, means for moving the finder at right angles to said members, said finder having a notch into which a selected member falls by gravity, yielding means acting on said members tending to depress them, and a spring actuated locking pin for each member.

13. In a device of the class described, a variable speed transmission gearing having shiftable elements, pivotally mounted links coöperating with said elements, a controller and a slidably mounted selective finder coöperating with said links.

14. In a device of the class described, a variable speed transmission gearing having shiftable elements, pivotally mounted links coöperating with said elements and a slidably mounted selective finder coöperating with said links, and a foot pedal for shifting said links.

15. In a device of the class described, a variable speed transmission gearing having shiftable elements, pivotally mounted links coöperating with said elements, a slidably mounted selective finder coöperating with said links, and a foot pedal for shifting said links, a connection with the foot pedal coöperating with said links.

16. In a device of the class described, the combination with a variable speed transmission gearing having a plurality of shiftable elements, and a clutch pedal, of a gear shift actuating member coöperating with said clutch pedal, movably mounted connections between said shiftable elements and said actuating member, an indicator, and a controller adapted to be predeterminedly set by said indicator to place said movably mounted connections in operative relation to said actuating member.

Signed by me at Kansas City, Mo., this 6th day of May, 1913.

EDWARD C. BURNS.

Witnesses:
CHARLES E. THOMPSON,
HARLAN THOMPSON.